(12) United States Patent
Nuti et al.

(10) Patent No.: US 10,683,899 B2
(45) Date of Patent: Jun. 16, 2020

(54) SYNCHRONIZER

(71) Applicant: Piaggio & C. S.p.A, Pontedera (PI) (IT)

(72) Inventors: Luca Nuti, Pontedera (IT); Walter Mariotti, Pontedera (IT)

(73) Assignee: PIAGGIO & C. S.P.A., Pontedera (PI) (IT)

( * ) Notice: Subject to any disclaimer, the term of this patent is extended or adjusted under 35 U.S.C. 154(b) by 229 days.

(21) Appl. No.: 15/749,446

(22) PCT Filed: Aug. 1, 2016

(86) PCT No.: PCT/EP2016/068312
§ 371 (c)(1),
(2) Date: Jan. 31, 2018

(87) PCT Pub. No.: WO2017/021358
PCT Pub. Date: Feb. 9, 2017

(65) Prior Publication Data
US 2019/0170197 A1    Jun. 6, 2019

(30) Foreign Application Priority Data
Aug. 3, 2015   (IT) .................. 102015000041442

(51) Int. Cl.
*F16D 13/18* (2006.01)
*F16D 28/00* (2006.01)
(Continued)

(52) U.S. Cl.
CPC ............. *F16D 13/18* (2013.01); *F16D 23/12* (2013.01); *F16D 28/00* (2013.01); *F16H 19/04* (2013.01)

(58) Field of Classification Search
CPC .......... F16D 13/18; F16D 23/02; F16D 23/04; F16D 23/12; F16D 28/00
See application file for complete search history.

(56) References Cited

U.S. PATENT DOCUMENTS

| | | |
|---|---|---|
| 623,550 A | 4/1899 | Keough |
| 2,609,902 A | 9/1952 | Stripling |

(Continued)

FOREIGN PATENT DOCUMENTS

| | | |
|---|---|---|
| FR | 396410 A | 4/1909 |
| GB | 719486 A | 12/1954 |
| JP | S4738342 U | 12/1972 |

*Primary Examiner* — David R Morris
(74) *Attorney, Agent, or Firm* — Volpe and Koenig, P.C.

(57) ABSTRACT

A synchronizer for a transmission to be used aboard a motor vehicle, includes: a primary shaft; a bell-shaped member assembled on the primary shaft having inside a friction cylindrical surface; a supporting element, revolvingly mounted on the primary shaft and housed within the bell-shaped member; a shoe having a friction profile located within an outer edge of the supporting element and faced towards the friction cylindrical surface of the bell-shaped member, jointed to the supporting element by a pair of arms in an articulated quadrilateral linkage configuration; and means for translating the shoe by rotating said arms both in clockwise and counter clockwise direction, by causing a projection of the shoe above the outer edge of the supporting element, interference of an end of the shoe with said friction cylindrical surface of the bell-shaped member, thereby causing a jamming thereof.

11 Claims, 4 Drawing Sheets

(51) Int. Cl.
 *F16D 23/12* (2006.01)
 *F16H 19/04* (2006.01)

(56) References Cited

U.S. PATENT DOCUMENTS

| | | | |
|---|---|---|---|
| 2,649,175 | A | 8/1953 | Stripling |
| 7,484,605 | B2 | 2/2009 | Pawley et al. |
| 7,882,758 | B2 | 2/2011 | Kubo et al. |
| 8,474,346 | B2 | 7/2013 | Matsumoto |
| 2006/0278487 | A1* | 12/2006 | Pawley .................. F16D 41/12 192/43.1 |
| 2009/0078073 | A1* | 3/2009 | Kubo ...................... F16D 21/04 74/335 |
| 2011/0000333 | A1* | 1/2011 | Matsumoto ............. F16H 63/18 74/745 |
| 2018/0328416 | A1* | 11/2018 | Nuti ....................... F16D 48/064 |
| 2019/0170197 | A1* | 6/2019 | Nuti ....................... F16D 13/18 |

* cited by examiner

B – B

SYNCHRONIZER

The present invention has as object a synchronizer for a speed transmission which can be used aboard a vehicle, in particular a motorcycle, which results to be of synchronized type, that is operating so that the two transmission portions which have to engage to transmit the torque are brought at the same speed, before the teeth of the clutch itself engage therebetween.

Generally, the synchronizers for known speed transmissions belong to the family of synchronizers of truncate conical ring synchronizers or to the family of the servo-locking synchronizers.

The first one are substantially consisted by two interacting truncate conical surfaces, integral one with a gear and the other one with a sliding sleeve equipped with front teeth implementing a clutch moving axially toward the gear.

This type of synchronizer does not guarantee a good operation if the manoeuvre for inserting the gears is performed very quickly or if there are very different speeds among the elements; furthermore the insertion of the gears always requests a certain effort, even if the clutch portions have equal speed.

The servo-locking synchronizers, instead, are structurally different and from the control lever they get only partially the force for synchronizing the shafts, but they are structurally complex and substantially suitable to high-performance transmissions for automotive and not in the field of the motor vehicles, in particular scooter.

U.S. Pat. No. 2,649,175 discloses a friction clutch having a primary shaft, a bell-shaped member assembled on the primary shaft and forming a friction surface on the inner cylindrical surface thereof, a supporting element revolvingly mounted on said primary shaft within the bell-shaped member, and a circular shoe which is translated through the swinging of a pendulum device triggered by a pinion rotated around the primary shaft.

U.S. Pat. No. 7,484,605 describes a clutch system with two concentric rings and a system of cams arranged therebetween which is actuated to obtain the mutual engagement thereof.

U.S. Pat. No. 7,882,758 still describes a system similar to the previous one wherein the cams are actuated by elements sensible to the centrifugal force.

U.S. Pat. No. 8,474,346 still describes an analogous system, wherein the cams are actuated by a rod system.

However, this type of clutches suffers from the drawback of having to actuate said cams with a predetermined force, so that they can implement the friction required to the clutch. U.S. Pat. No. 2,649,175 shows the problem of rotating a pinion revolvingly mounted on the primary shaft.

The technical problem underlying the present invention is to provide a synchronizer allowing to obviate the drawback mentioned with reference to the known art.

Such problem is solved by a synchronizer as specified above which characterizes in that it comprises:
a primary shaft;
a bell-shaped member assembled on said primary shaft having inside a friction cylindrical surface
a supporting element, revolvingly mounted on said primary shaft and housed within said bell-shaped member;
at least a shoe having a friction profile localised within the outer edge of the supporting element and faced towards the friction cylindrical surface of the bell-shaped member, jointed to said supporting element by a pair of arms in an jointed quadrilateral configuration; and
means for translating said shoe by rotating said arms both in clockwise and counterclockwise direction, by causing the projection of the shoe above the outer edge of the supporting element and the interference of an end of the shoe with said friction cylindrical surface of the bell-shaped member, by causing a jamming thereof.

The main advantage of the synchronizer according to the present invention lies in the fact of allowing the possibility of selecting each gear in any moment, by guaranteeing as additional feature that of being able to exploit the effect of the exhaust brake independently from the engaged gear and independently from the motor regime.

The present invention will be described hereinafter according to some preferred embodiment examples thereof, provided by way of example and not for limitative purpose by referring to the enclosed drawings wherein.

By referring to FIGS. 1 to 4, a synchronizer according to the invention is designated as a whole with 20.

It comprises a primary shaft 8 whereon a supporting element 2 is assembled with a roller bearing 7 interposing therebetween, and thereto a bell-shaped member 1 of the synchronizer overlaps. In this way, the supporting element 2 is revolvingly assembled on the primary shaft.

The supporting element 2 has the shape of a plate extending radially from the primary shaft 8 and it is included in the bell-shaped member 1, which has a friction inner cylindrical surface, coaxial to the primary shaft 8.

Figure 1:
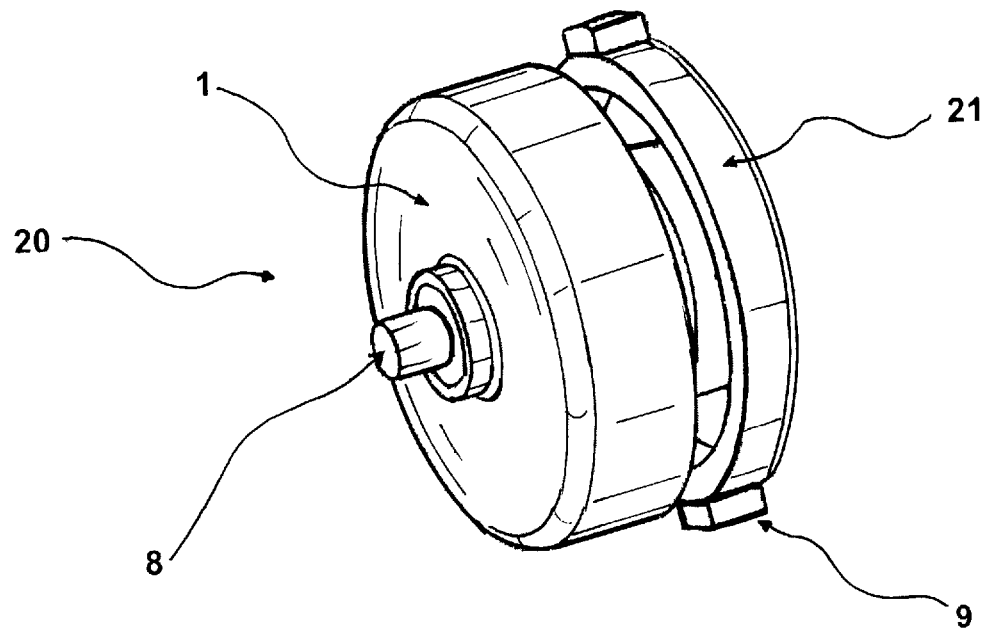
FIG. 1 shows an axonometric view of a first synchronizer example according to the present invention.
Figure 3:
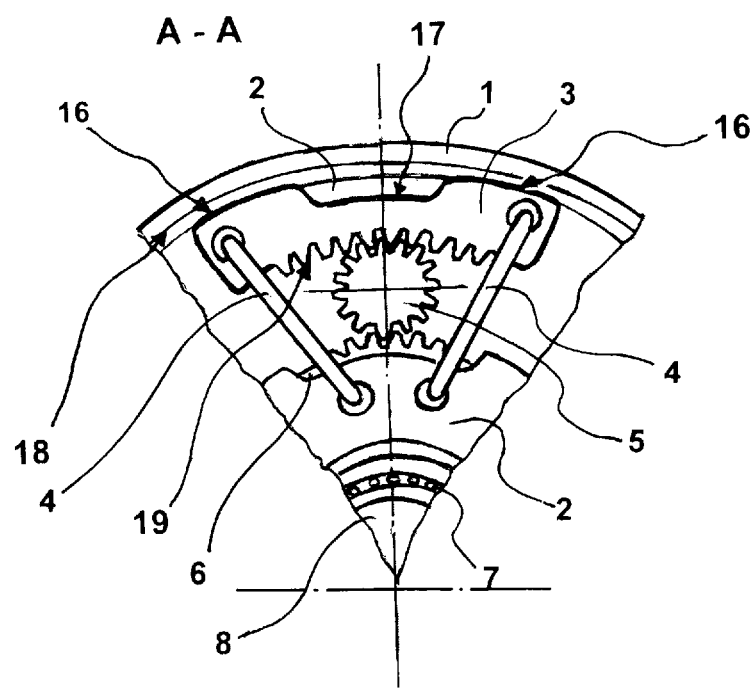
FIG. 3 shows a first cross and partial section of the synchronizer in FIG. 1, according to the section plane A-A of FIG. 2.
Figure 2:
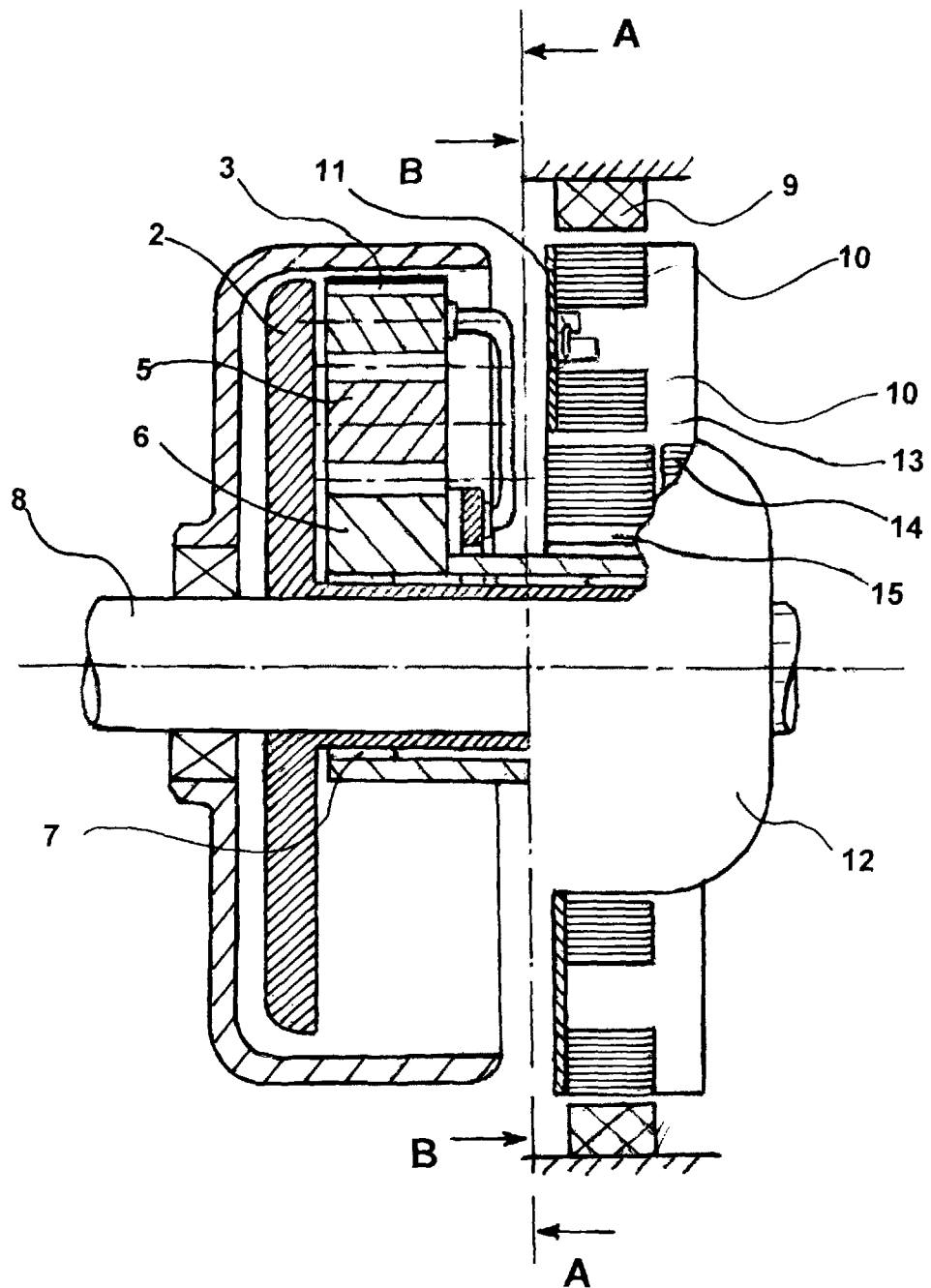
FIG. 2 shows a longitudinal section of the synchronizer of FIG. 1.
Figure 4:
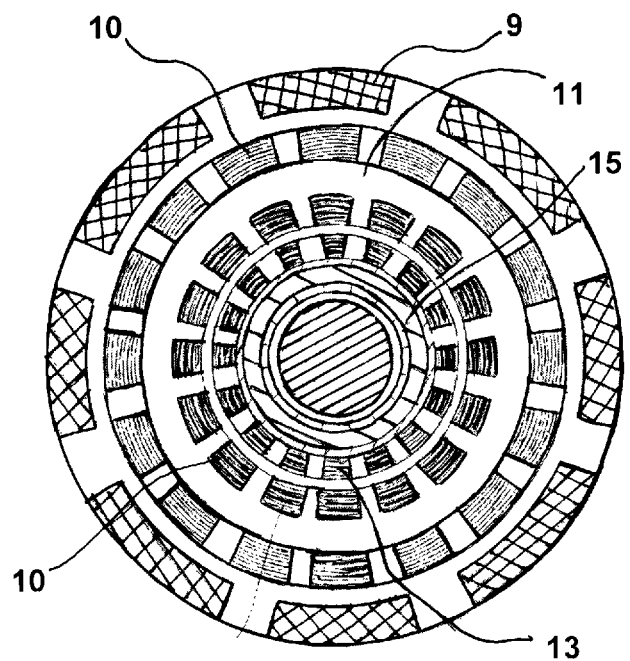
FIG. 4 shows a second complete cross section of the synchronizer in FIG. 1, according to the section plane B-B of FIG. 2.

By referring to FIG. 3, on the supporting element 2 a first rack 6 is provided, dragged therefrom in rotation. On the rack a pinion 5 is engaged which, in turn, engages in a second rack 19 formed on the inner face of a shoe 3. It has a circular profile which, under normal conditions, is flush with the outer edge of the supporting element 2 therefrom it does not project; therefore, it is circumscribed inside and localised within the outer edge of the supporting element 2, since it could not interfere, under normal conditions, with the bell-shaped member 1.

The shoe 3 has an elongated shape and it has an outer face acting like a friction surface as it is faced towards the inner cylindrical surface 18 of the bell-shaped member 1.

Such outer surface comprises a pair of linings 16, implemented by a coating made of suitable material at the shoe ends. It is to be meant that the two friction surfaces formed on the linings 16 are suitable to implement a sliding friction with the inner cylindrical surface 18 of the bell-shaped member 1, capable of slowing down the rotation of the bell-shaped member 1 with respect to the supporting element 2.

In particular, each one of the friction surfaces of the shoe 3 could have a profile with circular shape, with greater radius than the inner cylindrical surface 18 of the bell-shaped member 1, and made of suitable friction material, however known in the art.

Under normal conditions, the friction surface formed on each lining 16 and the inner cylindrical surface 18 of the bell-shaped member 1 do not touch, as the whole shoe 3 is included inside the supporting element thereof 2.

The shoe 3 is constrained to the supporting element 2 thanks to a pair of jointed arms 4: they are hinged to the ends of the first rack 6 and to the ends of the shoe so as to form therewith a jointed quadrilateral the arms 4 thereof are the levers. They have a wide apart arrangement and show a greater tilting than the radius passing through the joint thereof next to the rotation axis. The value of this tilting could be comprised between 0° and 20°, according to the sensibility which one wants to provide to the friction system.

It is to be noted, in fact, that by moving one of the arms by a certain angle both in clockwise direction and in the counterclockwise one, the shoe 3 assumes a position which does not follow any more the outer circular profile of the supporting element 2, but one of the ends thereof projects therefrom, by interfering with the inner cylindrical surface 18 of the bell-shaped member 1.

The rotation of the arms 4 then determines a translation of the side shoe 3 with respect to the rest position thereof, which is determined by the centrifugal force acting thereon.

This shifting then represents a deviation from an equilibrium position, and it can be caused by means for translating the shoe 3 which will be described hereinafter. It is to be noted that, due to the effect of the arms 4, the shoe 3 is obliged to follow a predefined trajectory which causes the interference thereof with the inner cylindrical friction surface of the bell-shaped member 1 in both rotation directions of the arms 4.

In the present example, the shifting can be caused by a rotation of the pinion 5, which is capable of moving laterally the shoe 3, by intervening on the second rack thereof 19, with respect to the first rack 6 which is integral with the supporting element 2.

The pinion 5, which will be actuated in rotation in the way which will be described hereinafter, and the first rack 6 constitute said means for translating laterally the shoe 3.

The synchronizer 20 then allows the motion transmission from the primary shaft 8 to the bell-shaped member 1, by using an actuation system which does not depend upon the rotation speed of the shaft itself. In other words, said actuation does not depend upon the occurrence of a certain predetermined rotation regime, but it can be controlled in any moment.

The particular system is integrating portion of a speed transmission allowing the possibility of selecting each gear in any moment, by guaranteeing as additional feature the fact of being able to exploit the exhaust brake effect independently from the engaged gear and independently from the engine regime.

Then, in a speed transmission using such synchronizer, the gear is selected by the driver or by a servosystem by keeping into account several operating parameters and not only by basing upon the rotation regime.

In the equilibrium configuration of the system, the shoe 3 and the first rack 6 rotate with the same angular speed, and even the pinion placed therebetween rotates at the same speed and remains in central position with respect to the arms 4.

However, it can work as planetary arrangement if it is controlled in rotation.

Since the trajectory of the pinion 5 does not develop along an arc of circle, the toothed profiles of the shoe 3 on the inner face thereof and of the rack 6 should have a suitable development, as well as a clearance allowing the shoe to translate without causing the jamming of the pinion 5.

The synchronizer 20 comprises a carter 21 coupled to the bell-shaped member 1 so as to create a substantially closed space. On the carter 21, that is on an inner cylindrical surface thereof, a plurality of magnets 9, of permanent type, is provided, radially positioned with respect to the driving axle.

The carter further includes an axial flow electric motor 12, of the stepping type, assembled coaxially to the primary shaft 8 and rotating therewith: it comprises a stator 13 and a rotor 14 faced one onto the other one. On the rotor 14 a grooved profile 15 is provided which will guarantee the rotation of the pinion 5 relatively to the primary shaft 8.

In this solution, the rotation speed and the related correct positioning of the elements have to be known accurately. The speed and consequently the rotation angle are detected by using the magnetic induction produced by said plurality of magnets 9, integral with the carter 21 also including electrical windings 10.

Due to the effect of the magnetic induction in the windings 10 an alternating current will be produced inside thereof.

The carter 21, at last, includes a printed circuit board 11 wherein some components, thereamong an AC/DC converter, which rectifies and modules suitably the current required to power supply the stepping motor 12, and a remotely-controlled activating system, capable of controlling the rotation of the rotor 14 of the electric motor 12 in response to a signal, are implemented.

Such rotation causes the shifting of the pinion 5 and consequently it will make the joined quadrilateral, formed by the shoe 3, the first rack 6 and by the jointed arms 4, to rotate. This rotation will allow the approaching of the shoe 3 to the inner surface of the bell-like shaped element 1 and then, at last, the synchronization.

It is to be noted that the radial contact force between bell-like shaped element 1 and shoe 3, required to transmit the requested pair, is not provided by the stepping motor 12 through the pinion 5, but it is due only to the geometry itself of the system which then will have to be suitably sized to guarantee the auto-jamming effect, however by avoiding too abrupt friction effects or unwished locking phenomena.

Therefore, this solution allows transmitting the torque produced by a motor, in particular a motor with small sizes such as a motor for scooters, by driving the transmission elements with forces and torques with modest size, that is the force which are sufficient to rotate the pinion 5 so as to cause the jamming between shoe 3 and bell-like shaped element 1.

At last, it is to be noted that the pinion 5 is capable of rotating in both directions, controlled by the stepping motor 12: in this way even the shoe 3 could be shifted laterally in both directions and, on the surface faced to the inner surface of the bell-shaped member 1, it will be equipped with a leading profile, that is a suitable lining, capable of developing friction in both directions, that is for the operation both with clockwise rotation and counterclockwise rotation.

This type of solution, with power supply and control implemented directly on a printed circuit board assembled in the stepping motor, allows eliminating any sliding contact, with considerable simplifications in terms of layout and reliability. However, the activation signal, both coming from the driver and coming from a slaved control unit, could be simply transmitted to the stepping motor.

However, it is to be meant that the stepping motor is one of the possible solutions to make the pinion 5 to rotate and/or to tilt the arms 4 by causing the side translation of the shoe 3.

Figure 5:
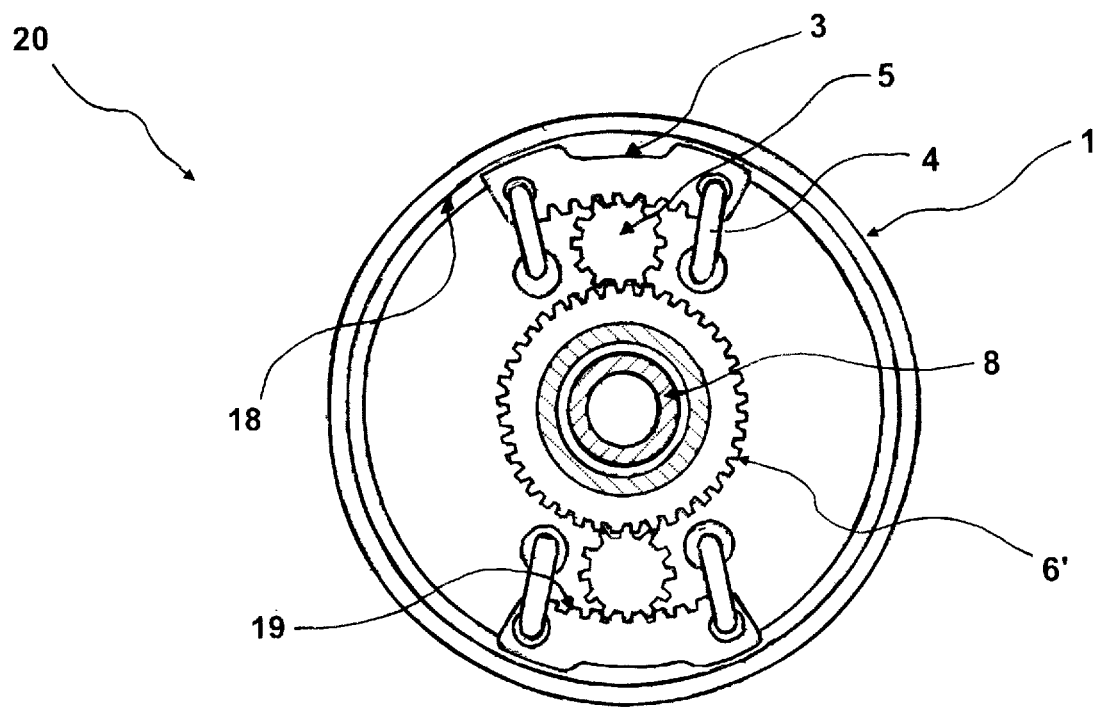
FIG. 5 shows a complete cross section of a second synchronizer embodiment according to the invention, corresponding to the section of FIG. 3.
Figure 6:
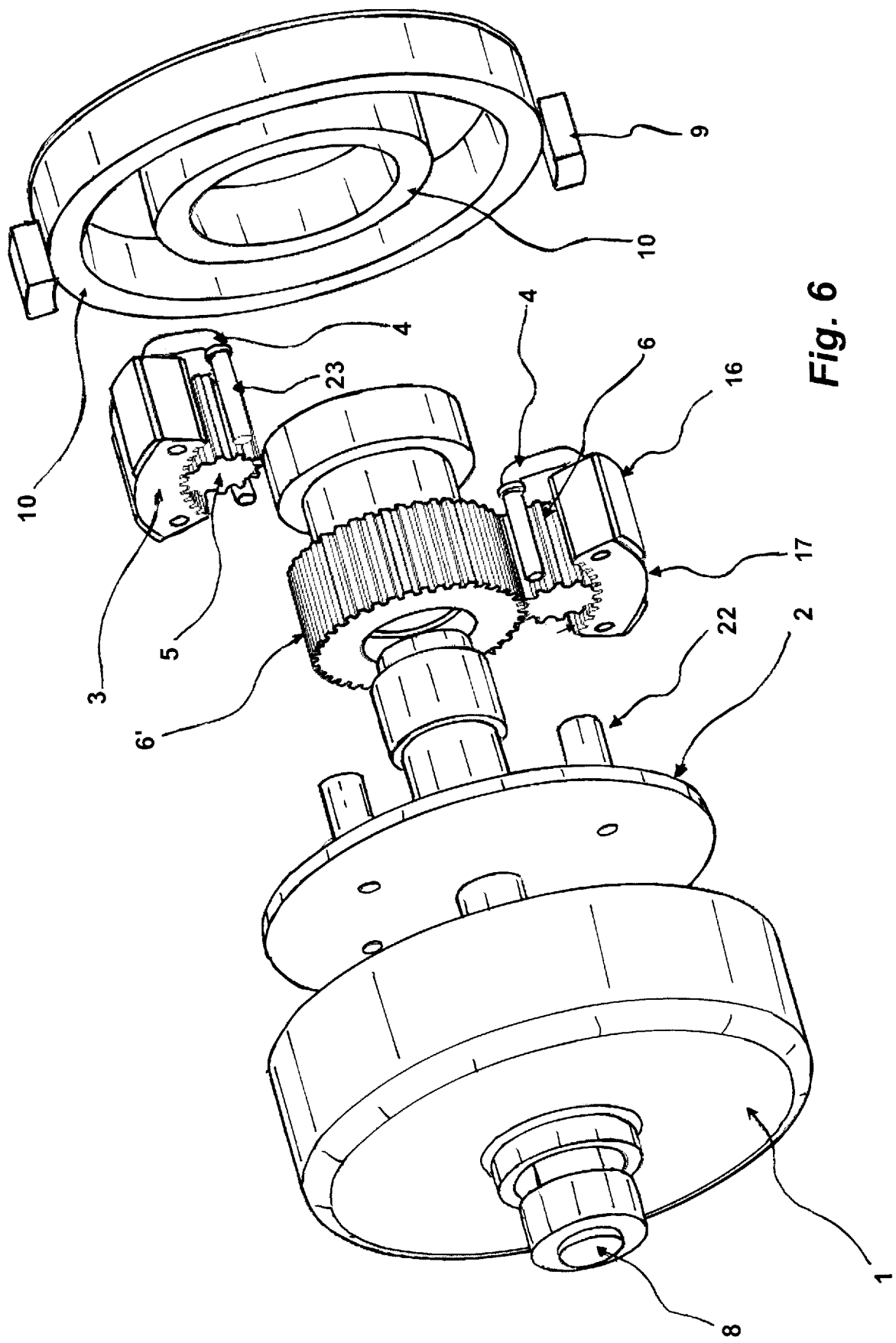
FIG. 6 shows an exploded axonometric view of the synchronizer of FIG. 5.

By referring to FIGS. 5 and 6, a second embodiment example of the synchronizer according to the invention will be described hereinafter, comprising some mechanical variants which however do not alter the operation thereof with respect what previously described. To this regard, the equal components and/or the components playing the same function keep the same numeral reference.

The synchronizer 20 of this new example comprises a primary shaft 8 whereon a supporting element 2 is assembled revolvingly.

The supporting element 2 has the shape of a plate extending radially from the primary shaft 8 and it is included in the bell-shaped member 1, which has a friction inner cylindrical surface 18, coaxial to the primary shaft 8.

The supporting element 2 comprises a crown gear 6', assembled too revolvingly on the shaft 8 and dragged thereby. To the crown gear 6' a pair of pinions 5 engages which, in turn, engage in an outer rack 19, formed on the inner face of a respective shoe 3, which in turn has a circular profile which, under normal conditions, is circumscribed and included inside the outer edge of the supporting element 2, since it cannot interfere, under normal conditions, with the bell-shaped member 1.

Each shoe 3 has an elongated shape and has an outer face acting as friction surface, since it is faced towards the inner cylindrical surface 18 of the bell-shaped member 1. Such outer surface comprises a pair of linings 16, implemented by a coating made of suitable material at the ends of the shoe.

It is meant that the two friction surfaces formed on the linings 16 are suitable to implement a sliding friction with the inner cylindrical surface 18 of the bell-shaped member 1, as described previously by referring to the first embodiment example. The shoe 3 is constrained to the supporting element 2 thanks to a pair of the jointed arms 4: they are hinged to the supporting element 2 having suitable projecting seats 22, which can receive corresponding pins 23 of the arms 4.

By shifting one of the arms by a certain angle both in clockwise direction and in counterclockwise direction, the shoe 3 assumes a position which does not follow any more the outer circular profile of the supporting element 2, but one of the ends thereof projects therefrom, by interfering with the inner cylindrical surface 18 of the bell-shaped member 1.

The rotation of the arms 4 then determines a translation of the side shoe 3 with respect to the rest position thereof, which is determined by the centrifugal force acting thereon.

This shifting then represents a deviation from an equilibrium position, and it can be caused by means for translating the shoe 3 which will be described hereinafter. It is to be noted that, due to the effect of the arms 4, the shoe 3 is obliged to follow a predefined trajectory which causes the interference thereof with the inner cylindrical friction surface of the bell-shaped member 1 in both rotation directions of the arms 4.

In the present example, the shifting can be caused by a rotation of the pinion 5, which is capable of moving laterally the shoe 3, by intervening on the second rack thereof 19, with respect to the first crown gear 6' which is integral with the supporting element 2.

The pinion 5, which will be actuated in rotation in the way which will be described hereinafter, and the crown gear 6' constitute said means for translating laterally the shoe 3.

The synchronizer 20 then allows the motion transmission from the primary shaft 8 to the bell-shaped member 1, by using an actuation system which does not depend upon the rotation speed of the shaft itself. In other words, said actuation does not depend upon the occurrence of a certain predetermined rotation regime, but it can be controlled in any moment.

The synchronizer 20 comprises a carter coupled to the bell-shaped member 1, whereon a plurality of magnets 9, of the permanent type, is assembled, positioned radially with respect to the driving axle, and which also includes suitable electrical windings 10. Due to the effect of the magnetic induction in the windings 10 an alternating current will be produced inside thereof.

The carter further includes an electric motor of the stepping type assembled coaxially to the primary shaft 8, wholly analogous to the motor described with reference to the previous embodiment example.

To the above described synchronizers a person skilled in the art, with the purpose of satisfying additional and contingent needs, could introduce several additional modifications and variants, all however within the protective scope of the present invention, as defined by the enclosed claims.

The invention claimed is:

1. A synchronizer (20) for a transmission to be used aboard a motor vehicle, the synchronizer (20) comprising:
   a primary shaft (8);
   a bell-shaped member (1) assembled on said primary shaft (8) having inside a friction cylindrical surface (18);
   a supporting element (2), revolvingly mounted on said primary shaft (8) and housed within said bell-shaped member (1);
   at least a shoe (3) having a friction profile located within an outer edge of the supporting element (2) and faced towards the friction cylindrical surface (18) of the bell-shaped member (1), jointed to said supporting element (2) by a pair of arms (4) in an articulated quadrilateral linkage configuration; and
   means for translating said shoe (3) by rotating said arms (4) both in clockwise and counter clockwise direction, by causing a projection of the shoe (3) above the outer edge of the supporting element (2), interference of an end of the shoe (3) with said friction cylindrical surface (18) of the bell-shaped member (1), thereby causing a jamming thereof.

2. The synchronizer (20) according to claim 1, wherein the supporting element (2) is assembled on the primary shaft (8) by a roller bearing (7).

3. The synchronizer (20) according to claim 1, wherein on the supporting element (2) a first rack (6) is provided, and on a face of the shoe (3) opposite to the friction surface thereof a second rack (19) is formed, a pinion (5) being engaged therebetween, the jointed arms (4) being hinged to respective ends of the first rack (6) and to the ends of the shoe (3) so as to form a spaced apart and substantially radial arrangement.

4. The synchronizer (20) according to claim 3, wherein the jointed arms (4) have a greater tilting than the radius passing through the joint thereof next to a rotation axis, the value of said tilting being comprised between 0° and 20°.

5. The synchronizer (20) according to claim 3, wherein said means for translating comprises said pinion (5) controlled in rotation with respect to the shoe (3) and to the primary shaft (8).

6. The synchronizer (20) according to claim 1, wherein on the supporting element (2) a crown gear (6') is provided, on a face of the shoe (3) opposite to the friction surface thereof a rack (19) is formed, a pinion (5) being engaged therebetween, the jointed arms (4) being hinged to the supporting element (2) and to the ends of the shoe (3) so as to form a spaced apart and substantially radial arrangement.

7. The synchronizer (20) according to claim 6, wherein the jointed arms (4) have a greater tilting than the radius passing through the joint thereof next to a rotation axis, the value of said tilting being comprised between 0° and 20°.

8. The synchronizer (20) according to claim 6, wherein said means for translating comprises said pinion (5) controlled in rotation with respect to the shoe (3) and to the primary shaft (8).

9. The synchronizer (20) according to claim 1, further comprising a carter (21) coupled to the bell-shaped member (1) having a plurality of permanent magnets (9) disposed thereon, positioned radially with respect to a driving axle, and electrical windings (10).

10. The synchronizer (20) according to claim 1, further comprising an electric motor (12) of the stepping type assembled coaxially to the primary shaft (8) and rotating therewith, having a stator (13) and a rotor (14) faced one onto the other one, the rotor (14) being connected to the means for translating said shoe (3).

11. The synchronizer (20) according to claim 10, wherein the electric motor (12) includes a printed circuit board (11) wherein an AC/DC converter and a remotely-controlled activating system are implemented, said system configured to control rotation of the rotor (14) of the electric motor (12) in response to a signal.

* * * * *